United States Patent
Ohayon et al.

(10) Patent No.: US 11,713,217 B2
(45) Date of Patent: Aug. 1, 2023

(54) ANTI-ROTATION DEVICE AND METHOD FOR LIFTING, SUSPENDING AND MOVING A LOAD

(71) Applicant: RTE RESEAU DE TRANSPORT D'ELECTRICITE, Paris la Défense (FR)

(72) Inventors: David Ohayon, Aix en Provence (FR); Stéphane Moreau, Paris la Défense (FR)

(73) Assignee: RTE RESEAU DE TRANSPORT D'ELECTRICITE, Paris la Defense (FR)

( * ) Notice: Subject to any disclaimer, the term of this patent is extended or adjusted under 35 U.S.C. 154(b) by 874 days.

(21) Appl. No.: 16/616,039

(22) PCT Filed: Jun. 18, 2018

(86) PCT No.: PCT/FR2018/051441
§ 371 (c)(1),
(2) Date: Nov. 22, 2019

(87) PCT Pub. No.: WO2018/234670
PCT Pub. Date: Dec. 27, 2018

(65) Prior Publication Data
US 2020/0087121 A1   Mar. 19, 2020

(30) Foreign Application Priority Data
Jun. 23, 2017   (FR) ...................................... 1755782

(51) Int. Cl.
*B66C 13/08* (2006.01)
*B64D 1/22* (2006.01)
*B66C 13/06* (2006.01)

(52) U.S. Cl.
CPC ............... *B66C 13/08* (2013.01); *B64D 1/22* (2013.01); *B66C 13/06* (2013.01)

(58) Field of Classification Search
CPC ....... B66C 13/06; B66C 13/063; B66C 13/08; B66C 13/085; B66C 13/46; B66C 2700/082; B64D 1/22
See application file for complete search history.

(56) References Cited

U.S. PATENT DOCUMENTS 6,533,220 B2 * 3/2003 Schuster .................. B64D 1/22
244/137.4
7,887,011 B1 * 2/2011 Baldwin .................. B64D 1/22
294/68.1

(Continued)

FOREIGN PATENT DOCUMENTS

DE      23 56 504       5/1975
EP      0 825 106       2/1998

(Continued)

OTHER PUBLICATIONS

International Search Report, PCT/FR2018/051441, dated Sep. 27, 2018.

*Primary Examiner* — Sang K Kim
*Assistant Examiner* — Nathaniel L Adams
(74) *Attorney, Agent, or Firm* — Nixon & Vanderhye (57) ABSTRACT

An anti-rotation device for suspending a load under a machine for lifting and moving this load includes a sling system provided with a fastener to the machine. It further includes a spreader beam, having a main longitudinal axis and a yaw rotation vertical transverse axis, including: a system for upper fastening to the sling system so it can be suspended in a substantially horizontal arrangement of its main longitudinal axis and free about its vertical transverse axis under the machine using the sling system; a system for lower fastening to the load, allowing driving of the load by (Continued)

the spreader beam about its vertical transverse axis. The spreader beam includes a propulsion unig disposed in such a way as to engage its rotation, selectively in one direction or in the other, about its vertical transverse axis when it is suspended from the machine via the sling system.

20 Claims, 3 Drawing Sheets

(56) References Cited

U.S. PATENT DOCUMENTS

| | | | | |
|---|---|---|---|---|
| 9,688,404 | B1* | 6/2017 | Buchmueller | B64D 1/12 |
| 10,870,558 | B2* | 12/2020 | Sikora | A61G 3/006 |
| 11,008,198 | B2* | 5/2021 | Sikora | B66C 13/08 |
| 11,040,768 | B2* | 6/2021 | Bailly | B64C 17/02 |
| 11,142,433 | B2* | 10/2021 | Sikora | B66C 13/08 |
| 2016/0297650 | A1* | 10/2016 | Bang | B66C 13/085 |
| 2017/0291707 | A1* | 10/2017 | Veronesi | B66C 23/18 |
| 2018/0282130 | A1* | 10/2018 | Kale | B66C 13/063 |
| 2019/0241267 | A1* | 8/2019 | Sikora | H04W 4/026 |
| 2020/0031438 | A1* | 1/2020 | Moses | B64C 25/54 |
| 2020/0407061 | A1* | 12/2020 | Hafenrichter | B64C 39/024 |
| 2021/0371252 | A1* | 12/2021 | Sikora | B66C 13/063 |
| 2022/0017335 | A1* | 1/2022 | Sikora | B66C 13/46 |
| 2022/0135378 | A1* | 5/2022 | Sikora | B66C 13/08 |
| | | | | 212/273 |

FOREIGN PATENT DOCUMENTS

| | | |
|---|---|---|
| JP | 04-256686 | 9/1992 |
| JP | 10-305989 | 11/1998 |

* cited by examiner

ANTI-ROTATION DEVICE AND METHOD FOR LIFTING, SUSPENDING AND MOVING A LOAD

BACKGROUND OF THE INVENTION

Field of the Invention

The present invention relates to an anti-rotation device for suspending a load under a machine for lifting and moving this load. It also relates to a method for lifting and moving a load using such an anti-rotation device.

It applies in particular, but not only, to the field of construction and maintenance of high-voltage power lines in which cables for transporting electric energy are mounted on successive pylons. Certain operations require for example the installation and mounting of these pylons. Given the total weight of a pylon and the limited lifting capabilities of a machine generally used for this type of operations, the pylon to be installed is designed in a plurality of independent sections to be mounted, or even to be fitted together, successively on top of each other at the location of installation. To do this, once the various elements have been brought close to the site by the road, the assembly of each section, then the lifting and the movement of each section using a lifting machine such as a heavy-lift helicopter from which a sling, at the free end of which the section in question is fastened, is suspended, are generally carried out. The first section of pylon is placed on the ground and each other section is fitted onto the previous one. One of the difficulties of this type of operation is in controlling the orientation of each section of pylon when it is placed on the ground or on the previous one, which gives rise to the need to provide an anti-rotation device.

The invention applies more generally to any field in which a heavy load must be lifted, moved and then deposited with good control of its orientation, regardless of the lifting machine used (helicopter, crane or other).

Description of the Related Art

A first solution generally recommended, namely with regard to placement of sections of pylons, involves lifting the load using an electric sling allowing its release and providing a plurality of guide ropes attached in the lower portion of the load, for example four ropes at the four corners of a rectangular segment of a lower portion of section, maintained under tension at their free ends by operators on the ground when the load is about to be deposited. But this solution, requiring the presence of people near the load and the lifting and moving machine, is difficult and time-consuming. It is furthermore potentially dangerous, in particular because, for reasons of safety in the case of a section of pylon, the load must be able to be released at any time by the helicopter in case of a problem encountered in the generally very restrictive phase of deposition on the ground or on the section previously placed.

A second solution specifically recommended in the placement of sections of pylons involves providing a helicopter designed for this task, thus optionally comprising its own non-removable means for rotating the lifted load. Given the safety constraints specific to helicopters, such a helicopter, generally qualified as a flying crane, must be very particular and is consequently very expensive. It is furthermore exclusively for use in lifting.

Another solution could involve limiting the orientation of the load with respect to the lifting and moving machine using a system of slings with a plurality of points of fastening onto the machine itself. This is for example what is recommended in the patent U.S. Pat. No. 6,533,220 B2 for lifting and moving by helicopter. But while this may be suitable for certain loads that are not too heavy, for example an intervention basket in which an operator sets up in order to intervene on a portion of a high-voltage power line, beyond a certain weight such as that of a section of pylon, this becomes dangerous given the inertial stress of the load exerted on the helicopter.

It can thus be desirable to provide an anti-rotation device for suspending a load that allows to eliminate at least a portion of the aforementioned problems and constraints.

SUMMARY OF THE INVENTION

An anti-rotation device for suspending a load under a machine for lifting and moving this load is thus proposed, comprising a sling system provided with an element for fastening to the lifting and moving machine, further comprising a spreader beam, having a main longitudinal axis and a yaw rotation transverse axis, this spreader beam comprising:

- a system for upper fastening to the sling system, designed in order to allow it to be suspended in a substantially horizontal arrangement of its main longitudinal axis and free about its yaw rotation transverse axis under the lifting and moving machine using the sling system,
- a system for lower fastening to the load, designed in order to allow driving of the load by the spreader beam around its yaw rotation transverse axis, the spreader beam further comprising propulsion means disposed in such a way as to engage its rotation on command, selectively in one direction or in the other, about its yaw rotation transverse axis when it is suspended from the lifting and moving machine via the sling system.

Such an autonomous anti-rotation device has the advantage of securing the operation of placement of a heavy load, in particular using a helicopter, by not requiring the presence of operators on the ground too close to the location of placement. In particular, the control of the yaw rotation of the load via the spreader beam, the orientation of which is itself controllable, for example on command remotely or by programming, ensures good control of the placement. Moreover, the freedom in rotation of the spreader beam about its yaw rotation transverse axis allows to reduce the transmission to the lifting and moving machine of the moments generated by the inertia of the lifted and moved load. Finally, it is simple to configure such an anti-rotation device in order for it to comply with the safety norms for helicopters not specifically designed for the movement of sections of pylons.

Optionally, the spreader beam is designed in three portions extending longitudinally:
- a central portion comprising means for supplying electric energy to the propulsion means, and
- two lateral portions, retractable against the central portion, comprising elements for propulsion via yaw rotation electrically connected to the power supply means of the central portion.

Also optionally, the propulsion means comprise a system of motorized propellers disposed at the longitudinal ends of the spreader beam.

Also optionally:
- a first propeller of the propulsion means, disposed at a first end of the spreader beam, can be activated according to a first rotation, comprised between 4000 and 6000 rpm, allowing a rotation of the spreader beam in a first direction of yaw rotation, and a second propeller of the propulsion means, disposed at a second end of the spreader beam, can be activated according to a second rotation, comprised between 4000 and 6000 rpm, allowing a rotation of the spreader beam in a second direction of yaw rotation opposite to the first direction.

Also optionally, each propeller of the propulsion means is disposed in a substantially cylindrical fairing duct around an axis orthogonal to the main longitudinal axis and to the yaw rotation transverse axis of the spreader beam.

Also optionally, a protective grill is disposed at the inlet and at the outlet of each fairing duct.

Also optionally, the spreader beam is provided with a visual indicator with at least three different visual states indicating an operating state of a yaw angular control of the spreader beam out of at least three possible different operational states:

a state in which the yaw angular control of the spreader beam is not activated, a state in which the yaw angular control of the spreader beam is activated but waiting for an angular control setting, and a state in which the yaw angular control of the spreader beam is activated and subject to a received angular setting.

Also optionally, a main sling of the sling system, intended to carry the yaw rotation transverse axis of the spreader beam, comprises a swivel for connection, to the lifting and moving machine or to the spreader beam, at one of its ends.

A method for lifting and moving a load using a suspension anti-rotation device according to the invention is also proposed, comprising the following steps:

fastening of the sling system of the suspension anti-rotation device to the lifting and moving machine, fastening of the suspension anti-rotation device to the load, elevation and movement of the load towards a zone of deposition using the lifting and moving machine, and during the step of elevation and of movement of the load, control of the propulsion means of the spreader beam in such a way as to maintain it in a defined setting direction about the yaw rotation transverse axis with respect to a reference frame linked either to the lifting and moving machine or to the ground.

Optionally, the load is a section of pylon for lines for transporting electricity by cable and the lifting and moving machine is a helicopter carrying the sling system.

BRIEF DESCRIPTION OF THE DRAWINGS

The invention will be better understood via the following description, given only as an example and made in reference to the appended drawings in which.

DESCRIPTION OF THE PREFERRED EMBODIMENTS

Figure 1:
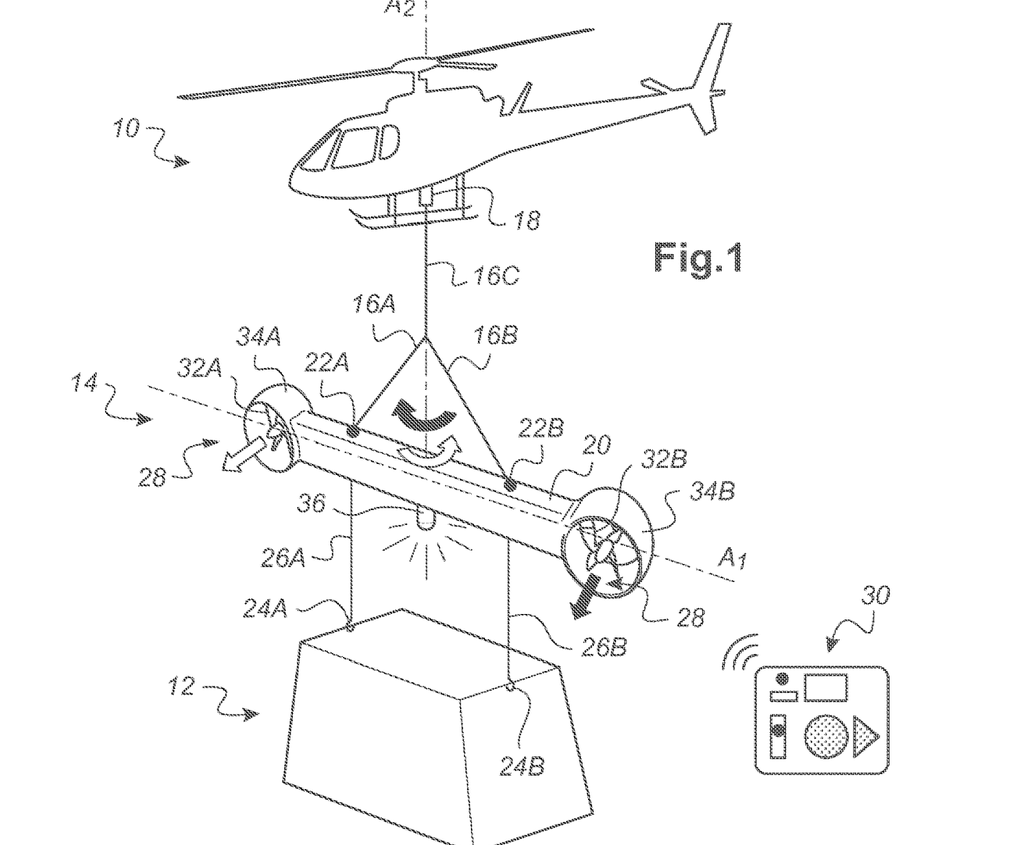
FIG. 1 schematically shows the general structure of an anti-rotation device for suspending a load, according to an embodiment of the invention.

The facility schematically shown in FIG. 1 comprises a lifting and moving machine 10, for example a helicopter, a load 12, for example a section of pylon for lines for transport of high-voltage electricity by cable, and an anti-rotation device 14 for suspending this load 12 under the lifting and moving machine 10.

The anti-rotation device 14 comprises a sling system 16A, 16B, 16C provided with an element 18 for fastening to the helicopter 10, for example a swivel 18. It further comprises a spreader beam 20, having a main longitudinal axis $A_1$ and a yaw rotation transverse axis $A_2$. The spreader beam 20 itself comprises a first system 22A, 22B for upper fastening to the sling system 16A, 16B, 16C and a second system 24A, 24B for lower fastening to the section of pylon 12.

The first system 22A, 22B for upper fastening is more precisely designed to allow the spreader beam 20 to be suspended in a substantially horizontal arrangement of its main longitudinal axis $A_1$ and free about its yaw rotation vertical transverse axis $A_2$ under the helicopter 10 using the sling system 16A, 16B, 16C: this is thus for example a system with two fastening hooks 22A and 22B disposed in the upper portion of the spreader beam 20 and equidistant from the yaw rotation transverse axis $A_2$ on either side of the latter. They are respectively attached at two ends of two slings 16A and 16B of the sling system, these slings 16A and 16B having the same length and joining up at an end of a third main sling 16C, the other end of which is fastened to the swivel 18 under the helicopter 10. The horizontality of the spreader beam 20 is thus ensured by the common length of the two slings 16A and 16B and by the equidistance from the two hooks 22A and 22B to the axis $A_2$. The freedom of rotation about the axis $A_2$ is allowed via the swivel 18. For reasons of safety, the slings 16A, 16B and 16C are advantageously dimensioned in order to ensure a height of at least 20 meters between the point of fastening to the helicopter 10 and the spreader beam 20, for example 30 meters +/−10%. But in general, the dimensioning of the slings 16A, 16B and 16C depends on the configuration of the terrain, thus on each situation. It is noted that numerous configurations are possible for the sling system and the arrangement of the swivel 18. Thus, alternatively, the swivel 18 could be disposed at the junction of the three slings 16A, 16B, 16C. Also alternatively, only two slings could be used, 16A and 16B, joining up directly under the helicopter 10 at the swivel 18.

The second system 24A, 24B for lower fastening is more precisely designed to allow an attachment with driving of the section of pylon 12 by the spreader beam 20 about its yaw rotation transverse axis $A_2$: this is thus for example a system with two remote fastening hooks 24A and 24B, the opening and closing of which can be electrically activated for a release of the load on command. They are for example disposed in the lower portion of the spreader beam 20 and equidistant from the yaw rotation transverse axis $A_2$ on either side of the latter, namely in order to ensure a certain balance of the anti-rotation assembly. As illustrated in FIG. 1, they can further be slung, for example over 10 meters +/−10% of height using two slings 26A and 26B extending vertically parallel to the axis $A_2$, in order to facilitate the attachment of the section of pylon 12 when the environment does not allow to completely lower the spreader beam 20 to the ground. But here again, the dimensioning of the slings 26A and 26B depends on the configuration of the terrain, and thus on each situation. Electric cables can run along the slings 16C, 16A, 16B, 26A, 26B from the helicopter 10 to the two electric hooks 24A and 24B in order to ensure the possibility of actuation of the latter for opening and closing by the pilot. They are even often indispensable for reasons of safety. Also for safety, these cables are integrated into sheaths inside the slings because it is very important to protect them against any damage.

According to a general principle of the present invention, the spreader beam 20 further comprises propulsion means 28 disposed in such a way as to engage its rotation on command, using a remote control 30 or via programming, selectively in one direction or in the other, about its yaw rotation transverse axis $A_2$ when it is suspended from the helicopter 10 via the sling system 16A, 16B, 16C. They comprise more precisely motorized propellers disposed at the two longitudinal ends of the spreader beam 20. At least one first propeller 32A is thus disposed at a first end of the spreader beam 20, on the same side as the hooks 22A and 24A with respect to the axis $A_2$. It is more precisely disposed in a first fairing duct 34A having a substantially cylindrical shape around an axis orthogonal to the axes $A_1$ and $A_2$. It can be activated according to a first rotation allowing a rotation of the spreader beam 20 in a first anti-clockwise direction of yaw rotation. At least one second propeller 32B is also disposed at a second end of the spreader beam 20, on the same side as the hooks 22B and 24B with respect to the axis $A_2$. It is more precisely disposed in a second fairing duct 34B having a substantially cylindrical shape around an axis orthogonal to the axes $A_1$ and $A_2$. It can be activated according to a second rotation allowing a rotation of the spreader beam 20 in a second clockwise direction of yaw rotation. The fairing ducts 34A, 34B carry out a first function of guiding and optimizing the propulsion by increasing its energy efficiency. They further carry out a function of protection of the propellers 32A, 32B or of the operators on the ground, wherein this second function can be advantageously reinforced by the presence of grills at the inlets and outlets of these ducts: this reduces the risk of collisions between foreign bodies and propellers or of injuries to operators liable to come close to the rotating propellers.

Finally, the spreader beam 20 is provided with a visual indicator 36 with a plurality of different visual states, for example a plurality of different colors, indicating an operating state of a yaw angular control of the spreader beam 20 out of a plurality of possible different operational states. Optionally but advantageously, at least three operating states are provided:
  a state in which the yaw angular control of the spreader beam 20 is not activated: the visual indicator 36 can indicate this state by the color red,
  a state in which the yaw angular control of the spreader beam 20 is activated but waiting for an angular control setting: the visual indicator 36 can indicate this state by the color orange, and
  a state in which the yaw angular control of the spreader beam 20 is activated and subject to a received angular setting: the visual indicator 36 can indicate this state by the color green.

The propulsion means 28 of the spreader beam 20 as well as the remote control 30 will now be described in detail in reference to FIG. 2.

According to a first possible embodiment, the remote control 30 comprises:
  an on switch 40,
  an indicator 42 of charge level of a battery for supplying electric energy (for example in the form of a bar graph),
  a selector 44 of mode, between a first mode of control of the yaw orientation of the beam 20 with respect to an angular reference frame linked to the helicopter 10 and a second mode of control of the yaw orientation of the beam 20 with respect to an angular reference frame linked to the ground,
  a screen 46 for displaying an angle setting $\alpha_C$,
  a wheel 48 for adjusting the angle setting $\alpha_C$ displayed on the screen 46, and
  a servo control switch 50, in order to activate or deactivate a yaw angular control of the spreader beam 20 with respect to the angle setting $\alpha_C$ displayed.

Such a control 30 can be made available to the pilot or to a co-pilot of the helicopter 10, who has the choice between the first and second control modes according to whether he/she is loading, transporting or depositing the section of pylon 12, or even transporting the empty spreader beam 20.

According to a simplified alternative, the control 30 can comprise no mode selector 44 and operate only according to the second control mode. Such a simplified control can be made available to an operator on the ground.

Figure 2:
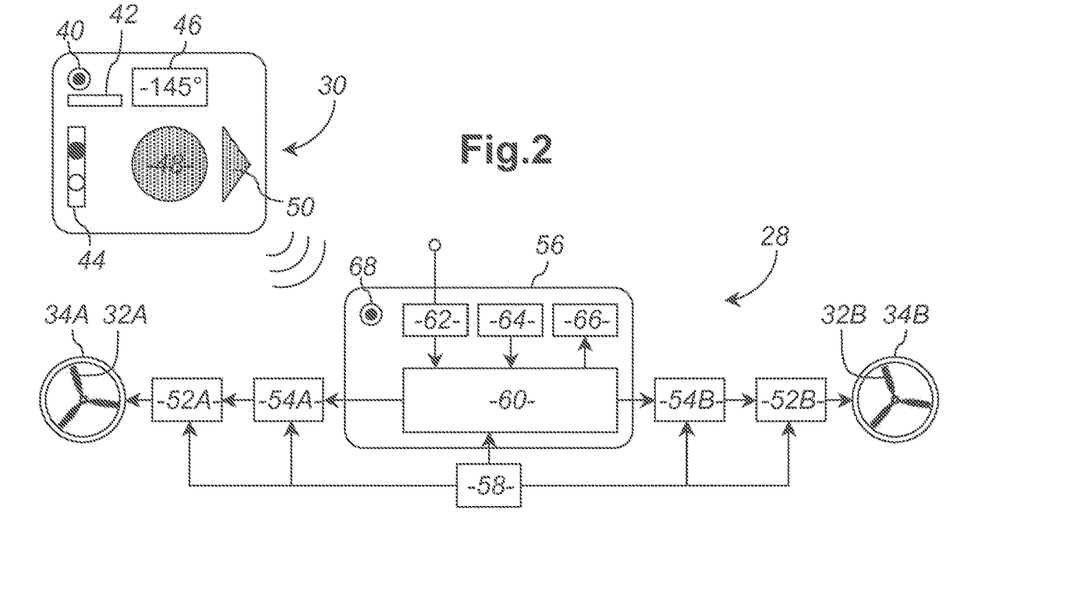
FIG. 2 shows schematically and in detail the functional electromechanical elements of the anti-rotation device of FIG. 1.

The propulsion means 28 functionally illustrated in FIG. 2 are integrated into the spreader beam 20. They comprise the first propeller 32A integrated into its fairing duct 34A, a first motor 52A for driving the first propeller 32A and a first variator 54A controlling the power of the first motor 52A. They further comprise the second propeller 32B integrated into its fairing duct 34B, a second motor 52B for driving the second propeller 32B and a second variator 54B controlling the power of the second motor 52B. Finally, they comprise an electronic control box 56 designed to control the first and second variators 54A, 54B. The electronic control box 56, the variators 54A, 54B and the motors 52A, 52B are supplied with electric energy by one or more batteries 58 also integrated into the spreader beam 20.

The electronic control box 56 comprises more precisely a microcontroller 60 programmed to control the first and second variators 54A, 54B. It further comprises a receiver 62 of wireless signals emitted by the remote control 30, this receiver 62 being connected to the microcontroller 60 in order to provide it with a control signal, the angle setting $\alpha_C$ and, if necessary, the yaw orientation of the longitudinal axis of the helicopter 10 with respect to a reference frame linked to the ground. This direction will be noted as $\alpha_H$. It further comprises an electronic compass 64 allowing to know at each instant the yaw orientation of the longitudinal axis $A_1$ of the spreader beam 20 with respect to a reference frame linked to the ground. This orientation will be noted as $\alpha_P$. It further comprises an indicator 66 of charge level of the battery or batteries 58. Finally, it comprises an on switch 68.

Figure 3:
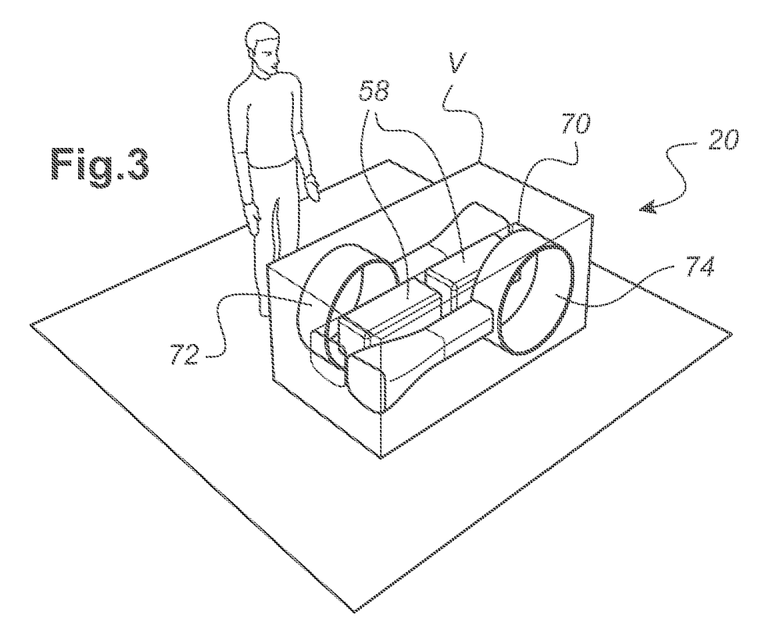
FIG. 3 illustrates a disassembled arrangement of a spreader beam of the anti-rotation device of FIG. 1.

As illustrated in FIG. 3, the spreader beam 20 is advantageously designed in three portions intended to extend longitudinally along the main axis $A_1$ when it is mounted and operational. A central portion 70 comprises the means for supplying electric energy to the propulsion means 28, that is to say the battery or batteries 58. Two batteries 58 are illustrated in FIG. 3 and are for example mounted on guide rails, with access hatches and devices for locking in position, in the central portion 70 for simplified manipulation for installation or replacement. They are also thus protected against impacts and the environment. The central portion 70 can further comprise the electronic control box 56, the indicator 66 of charge level of which can remain visible on the surface. A first lateral portion 72 is for example fastened by a pivot link with the central portion 70 using a hinge, in such a way as to be able to be retracted against the latter in a storage configuration. It comprises for example the first variator 54A, the first motor 52A and the first propeller 32A in its fairing duct 34A. Alternatively the first lateral portion could be designed to be able to be completely disconnected from the central portion 70. A second lateral portion 74 is also for example fastened by a pivot link with the central portion 70 using a hinge, in such a way as to be able to be retracted against the latter in a storage configuration. It comprises for example the second variator 54B, the second motor 52B and the second propeller 32B in its fairing duct 34B. Alternatively the second lateral portion could be designed to be able to be completely disconnected from the central portion 70.

As clearly shown in FIG. 3, this configuration of the spreader beam 20 allows it to be stored in a very compact volume V, for example in the helicopter 10, before being mounted on the ground in order to then be used. Given the optimal length of such a spreader beam 20 during use for the mounting of pylons carrying electric lines, approximately several meters, for example approximately 5 meters, this configuration in three retractable portions is truly advantageous.

Figure 4:
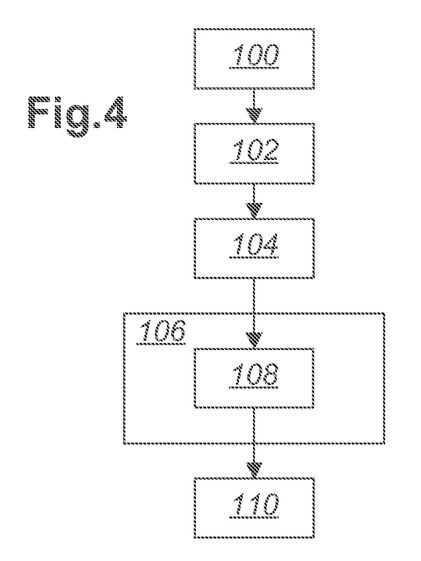
FIG. 4 illustrates the successive steps of a method for lifting and moving a load using the anti-rotation device of FIG. 1.

FIG. 4 illustrates the successive steps of a method for lifting and moving a load, for example the section of pylon 12, using the anti-rotation device 14 described above.

During a previous step 100, the spreader beam 20 is brought, for example by helicopter 10, and mounted at the location of lifting of the section of pylon 12. It is turned on by actuation of its switch 68 and its level of battery charge visible on the indicator 66 can thus be checked. The sling system 16A, 16B, 16C is fastened to the spreader beam 20 via the hooks 22A and 22B in order to form the anti-rotation device 14.

During a step 102, the sling system 16A, 16B, 16C is fastened to the helicopter 10, for example using the swivel 18.

During a step 104, the anti-rotation device 14 is fastened to the section of pylon 12 via the optionally slinged electric hooks 24A and 24B.

Then, during a step 106 of elevation and of movement of the load, the helicopter 10 transports the section of pylon 12 to a zone of deposition in order to place it on the ground or on another section of pylon in this zone. During this step, the propulsion means 28 of the spreader beam 20 can be controlled (step 108), using the remote control 30 or by programming, in order to maintain the spreader beam 20 in a setting direction defined about the yaw rotation transverse axis with respect to a reference frame linked either to the helicopter 10 or to the ground. For example, in a phase of lifting of the section of pylon, the propulsion means 28 can be controlled in order to maintain the spreader beam 20 in the direction that it had on the ground, in such a way as to prevent the section of pylon 12 from turning on itself about the axis $A_2$; in a phase of transport of the section of pylon 12, or in a phase of transport of the empty spreader beam 20 if necessary, the propulsion means 28 can be controlled in order to maintain the spreader beam 20 in the longitudinal axis of the helicopter 10 and thus reduce its lift; in a phase of deposition of the section of pylon 12 on the ground or on another section of pylon, the propulsion means 28 can be controlled in order to orient the spreader beam 20 and the section of pylon 12 in the correct direction of deposition.

Finally, during a last step 110, the section of pylon 12 is deposited according to the desired orientation by releasing by remotely activating the opening of the electric hooks 24A and 24B.

The steps 104 to 110 that have just been described can be repeated for the complete mounting of a pylon consisting of a plurality of sections. They are advantageously part of a conventional procedure of mounting of a pylon, carried out from an assembly platform for mounting in a zone of deposition.

Given the loads to be carried and the safety requirements for any lifting and moving by helicopter in this type of procedure, the following constraints can be advantageously respected:
  choice of carbon-fiber composite materials for the frame of the spreader beam 20 and its fairing ducts 34A, 34B, optionally also even for the propellers 32A, 32B, for an anti-rotation assembly not exceeding 5 meters long, 150 kg and capable of carrying up to 4.5 tons of load static and 19 tons dynamic,
  choice of motors 52A, 52B with a power close to 15 kW or greater, for a weight of less than 2 kg each, allowing a thrust of more than 400 Newtons when coupled with the propellers 32A, 32B,
  choice of propellers 32A, 32B capable of rotating from 4000 to 6000 rpm, in which case the direction of rotation of such propellers cannot be inverted: this does not raise any issue under the condition that the propellers are actuated alternatively and never together,
  choice of batteries having at least 5 hours of battery life during control, supporting a total voltage of 48 V and a charging capacity of 100 A.h: two batteries of 24V each, of the Li—Fe—Po type and the total weight of which is approximately 50 kg, mounted in series, can be suitable.

Figures 5, 6:
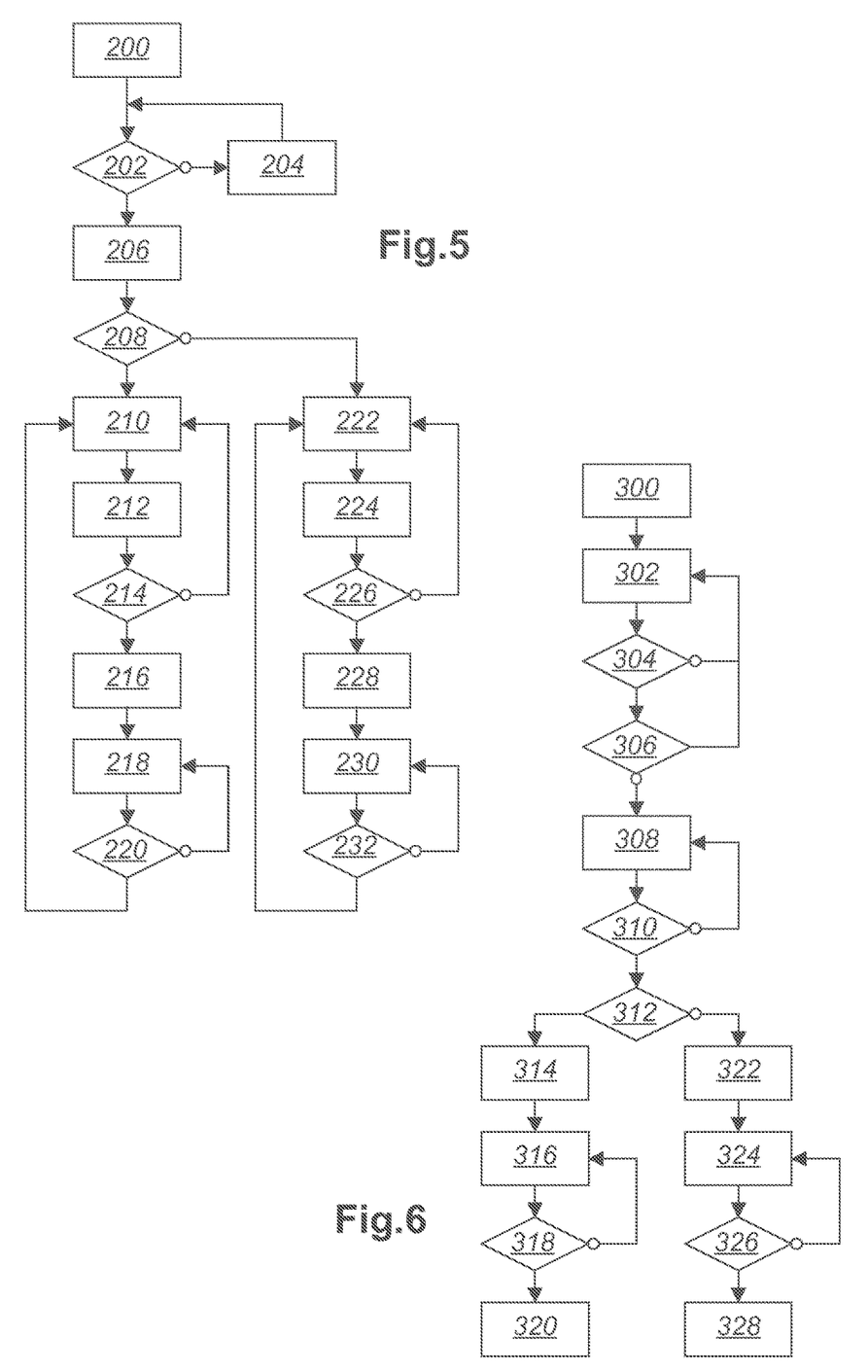
FIG. 5 illustrates the successive steps of a method of operation of a remote control of the anti-rotation device of FIG. 1.
FIG. 6 illustrates the successive steps of a method of operation of a microcontroller of the anti-rotation device of FIG. 1.

The operation of the remote control 30, in its alternative including the mode selector 44, will now be described in detail in reference to the flow chart of FIG. 5.

During a first step 200, this remote control 30 is entrusted to the pilot or to a co-pilot of the helicopter 10. It has a main indicator indicating that it is turned on and a control indicator indicating the activation or the deactivation of the angular control. These indicators are for the moment turned off.

The following step 202 is a step of waiting for the turning on of the remote control 30 using the switch 40. As long as it remains turned off, the main indicator remains off and the overall power is cut off (step 204). As soon as the pilot or co-pilot acts on the switch 40, the remote control 30 turns on, its main indicator turns on, the indicator 42 of charge level is activated and a signal of information of turning on is transmitted to the receiver 62 of the electronic control box (step 206).

After being turned on, the state of the mode selector 44 is tested during a step 208. If the mode selector 44 is on the first mode of yaw control of the beam 20 with respect to an angular reference frame linked to the helicopter 10, a series of steps 210 to 220 is carried out. If the mode selector 44 is on the second mode of yaw control of the beam 20 with respect to an angular reference frame linked to the ground, a series of steps 222 to 232 is carried out.

Step 210 is a step of indication that the remote control 30 is waiting for an angular-control setting. This can be done using a predetermined message, for example "STBY", on the display screen 46.

Step 212 is a step of action on the control indicator in order for it to indicate the deactivation of the angular control. The control indicator is thus for example the color red.

The following step 214 is a step of waiting for action on the servo control switch 50. As long as the pilot or co-pilot does not act on this switch 50, it is not continued past the steps 210 and 212. As soon as the angular control is activated by action on the switch 50, a step 216 is carried out of action on the control indicator in order for it to indicate the activation of the angular control. The control indicator thus goes for example to the color green and the angle setting $\alpha_C$ displayed on the screen 46 is initialized to zero. A signal of information of activation of the angular control is moreover transmitted to the receiver 62 of the electronic control case 56.

The following step 218 is a step of possible action on the wheel 48 in order to adjust a desired value of angle setting $\alpha_C$, for example between −180 and +180 degrees with respect to the angle zero initialized in step 216. As long as the control is activated (control indicator green), the value of angle setting $\alpha_C$ chosen is regularly transmitted to the receiver 62 of the electronic control box with the angular orientation $\alpha_H$ of the helicopter 10 with respect to an angular reference frame linked to the ground. It is thus possible to change the angle setting $\alpha_C$ as often as desired. It is noted that this step uses an electronic compass on board the helicopter 10 in order to know its orientation $\alpha_H$.

Finally, step 220 is a step of waiting for action on the servo control switch 50. As long as the pilot or co-pilot does not once again act on this switch 50, it is not continued past step 218: for example during the entire unfolding of a step of transport and of placement of a section of pylon. As soon as the angular control is deactivated by action on the switch 50, for example once the section of pylon 12 is deposited as desired, step 210 is returned to: the display on the screen 46 thus goes back to the indication "STBY" and the control indicator goes back to the color red.

Steps 222 to 232 are respectively identical to steps 210 to 220 with the exception of step 230 which does not comprise the transmission of the angular orientation $\alpha_H$ of the helicopter 10 with respect to an angular reference frame linked to the ground.

Of course, the operation of the remote control 30 can be easily simplified on the basis of that which has been described in detail above if it does not comprise a mode selector for a use by an operator on the ground.

The operation of the microcontroller 60 of the control box 56 of the anti-rotation device 14 will now be described in detail in reference to the flow chart of FIG. 6. This operation allows the use of a plurality of remote controls 30, with or without a mode selector.

During a first step 300, the electronic control box 56 is turned on by action on the switch 68. This action triggers the switching of the visual indicator 36 to red (step 302) and the indication of the level of charge of the batteries 58 on the indicator 66.

Then, during a test step 304, the microcontroller 60 executes a search in order to verify whether at least one remote control 30 is turned on. If this is not the case, step 302 is again carried out.

If at least one remote control 30 is turned on, another test step 306 is carried out during which the microcontroller 60 executes a search in order to verify whether at least two remote controls 30 are turned on. If this is the case, the step 302 is again carried out, the microcontroller 60 not accepting the simultaneous use of two activated remote controls or more.

If one and only one remote control 30 is turned on, a step 308 is carried out of switching the visual indicator 36 to orange.

The following step 310 is a step of waiting to receive an angular-control setting. As long as the angular control of the spreader beam 20 is not activated by action on the switch 50 of a remote control 30, the microcontroller 60 loops back to steps 308 and 310.

When the receiver 62 receives a signal of information indicating the activation of the angular control, the visual indictor 36 switches to green and a new test step 312 is carried out.

During this step 312, the microcontroller 60 verifies whether the receiver 62 receives the value of angle setting $\alpha_C$ alone or accompanied by the angular orientation $\alpha_H$ of the helicopter 10.

If the receiver 62 receives the two angular values $\alpha_C$ and $\alpha_H$, then this means that the single remote control 30 activated is in the first mode of yaw control of the beam 20 with respect to an angular reference frame linked to the helicopter 10 and the microcontroller 60 proceeds to the execution of a series of steps 314 to 320. If the receiver 62 only receives the value of angle setting $\alpha_C$, then this means that the single remote control 30 activated is in the second mode of yaw control of the beam 20 with respect to an angular reference frame linked to the ground and the microcontroller 60 proceeds to the execution of a series of steps 322 to 328.

During step 314, the microcontroller 60 also goes into the first mode of yaw control of the beam 20 with respect to an angular reference frame linked to the helicopter 10.

Consequently, it executes the following calculation during step 316: $\Delta=\alpha_P-(\alpha_H-\alpha_C)$, with $\alpha_P$ the angular value provided by the electronic compass 64.

Then, during the test step 318, the microcontroller 60 compares the result of its calculation $\Delta$ to a predetermined threshold value of angular tolerance, for example 5 degrees. As long as $\Delta$ remains less than this threshold value, step 316 is returned to.

As soon as $\Delta$ exceeds the threshold value, the microcontroller 60 proceeds to the step 320 of actuating one of the two propellers 32A and 32B in order to replace the spreader beam 20 into an orientation $\alpha_P$ as close as possible to $\alpha_H-\alpha_C$.

During step 322, the microcontroller 60 goes into the second mode of yaw control of the beam 20 with respect to an angular reference frame linked to the ground.

Consequently, it executes the following calculation during step 324: $\Delta=\alpha_P-\alpha_C$, with $\alpha_P$ the angular value provided by the electronic compass 64.

Then, during the test step 326, the microcontroller 60 compares the result of its calculation $\Delta$ to the predetermined threshold value of angular tolerance. As long as $\Delta$ remains less than this threshold value, step 324 is returned to.

As soon as $\Delta$ exceeds the threshold value, the microcontroller 60 proceeds to the step 328 of actuating one of the two propellers 32A and 32B in order to replace the spreader beam 20 into an orientation $\alpha_P$ as close as possible to $\alpha_C$.

Steps 320 and 328 can be followed by a respective return to steps 316 and 324, further knowing that at any moment, the pilot, the co-pilot or the operator on the ground can change the angle setting $\alpha_C$ using the wheel 48.

Moreover, at any moment between the steps 312 to 320 or 328, any action on the switch 50 of the remote control 30 activated causes a return of the microcontroller 60 to step 308. Likewise, any action on the switch 40 of any one of the remote controls 30 between the steps 308 and 320 or 328 causes a return of the microcontroller 60 to step 302.

It is clear that an anti-rotation device like that described above allows to control the yaw rotation on itself of a load from a single point of attachment onto a machine for lifting and moving this load, without transmission of the moments engendered by the load. The device furthermore has a simple design, adjustment, use and maintenance. It also allows, via the electric hooks 24A, 24B, an automatic emergency release for more safety. It is also relatively light, autonomous in terms of consumption of electric energy, and can be actuated remotely from the lifting and moving machine or from the ground. No human presence is therefore necessary near the load. Finally, it is easy to design in order to not disturb the electric devices of a carrying machine such as a helicopter.

Moreover, it is noted that the invention is not limited to the embodiment and to the alternatives described above.

In particular, an embodiment has been described in detail according to which the propulsion means 28 are actuated using one or more remote controls 30. But another embodiment could provide a previous recording of one or more angle settings $\alpha_C$, for example in the form of GPS coordinates (from "Global Positioning System"), directly in the microcontroller 60. In this case the control of the propulsion means 28 is possible at least partly via programming.

More generally, it is clear to a person skilled in the art that various modifications can be made to the embodiments described above, in light of the teaching that has just been disclosed to them. In the following claims, the terms used must not be interpreted as limiting the claims to the embodiments disclosed in the present description, but must be interpreted in order to include therein all the equivalents that the claims aim to cover due to their wording and the providing of which is within the reach of a person skilled in the art by applying the general knowledge thereof to the implementation of the teaching that has just been disclosed thereto.

The invention claimed is:

1. An anti-rotation device (14) for suspending a load (12) under a machine (10) for lifting and moving the load (12), comprising:
a sling system (16A, 16B, 16C) provided with an element (18) for fastening to the lifting and moving machine (10); and
a spreader beam (20) having a main longitudinal axis ($A_1$) and a yaw rotation transverse axis ($A_2$),
the spreader beam (20) including each of:
a system (22A, 22B) for upper fastening to the sling system (16A, 16B, 16C), configured so that the spreader beam is suspended in a substantially horizontal arrangement of the main longitudinal axis ($A_1$) and free about the yaw rotation transverse axis ($A_2$) beneath the lifting and moving machine (10),
a system (24A, 24B, 26A, 26B) for lower fastening to the load (12), configured to allow driving of the load (12) by the spreader beam (20) around the yaw rotation transverse axis (A2), and
propulsion means (28) disposed in such a way as to cause a rotation of the spreader beam (20), on command, selectively in either of a first or a second direction, about the yaw rotation transverse axis ($A_2$) when the spreader beam is suspended from the lifting and moving machine (10) via the sling system (16A, 16B, 16C), and the spreader beam (20) incorporating three portions (70, 72, 74) extending longitudinally, including:
a central portion (70) comprising means (58) for supplying electric energy to the propulsion means (28), and
two lateral portions (72, 74) with said propulsion means provided thereon, the two lateral portions (72, 74) each being fastened by respective pivot links to the central portion in such a way as to be retractable against the central portion (70), and said propulsion means comprising elements (32A, 52A, 54A, 32B, 52B, 54B) for propulsion electrically connected to the power supply means (58) of the central portion (70).

2. The suspension anti-rotation device (14) according to claim 1, wherein the propulsion means (28) comprise a system of motorized propellers (32A, 52A, 32B, 52B) disposed at longitudinal ends of the spreader beam (20).

3. The suspension anti-rotation device (14) according to claim 2, wherein:
a first propeller (32A) of the propulsion means (28), disposed at a first end of the spreader beam (20), can be activated according to a first rotation, comprised between 4000 and 6000 rpm, allowing a rotation of the spreader beam (20) in the first direction of yaw rotation; and
a second propeller (32B) of the propulsion means (28), disposed at a second end of the spreader beam (20), can be activated according to a second rotation, comprised between 4000 and 6000 rpm, allowing a rotation of the spreader beam (20) in the second direction of yaw rotation opposite to the first direction.

4. The suspension anti-rotation device (14) according to claim 3, wherein the spreader beam (20) has a visual indicator (36) mounted thereon with at least three different visual states indicating an operating state of a yaw angular control of the spreader beam (20) out of at least three possible different operational states:
a state in which the yaw angular control of the spreader beam (20) is not activated,
a state in which the yaw angular control of the spreader beam (20) is activated but waiting for an angular control setting, and
a state in which the yaw angular control of the spreader beam (20) is activated and subject to a received angular setting.

5. The suspension anti-rotation device (14) according to claim 3, wherein a main sling (16C) of the sling system (16A, 16B, 16C), for carrying the yaw rotation transverse axis ($A_2$) of the spreader beam (20), comprises a swivel (18) at one end of the main sling (16C) for connection to one of the lifting and moving machine (10) and to the spreader beam (20).

6. The suspension anti-rotation device (14) according to claim 2, wherein each propeller (32A, 32B) of the propulsion means (28) is disposed in a substantially cylindrical fairing duct (34A, 34B) around an axis orthogonal to the main longitudinal axis ($A_1$) and to the yaw rotation transverse axis ($A_2$) of the spreader beam (20).

7. The suspension anti-rotation device (14) according to claim 6, wherein the spreader beam (20) has a visual indicator (36) mounted thereon with at least three different visual states indicating an operating state of a yaw angular control of the spreader beam (20) out of at least three possible different operational states:
a state in which the yaw angular control of the spreader beam (20) is not activated, a state in which the yaw angular control of the spreader beam (20) is activated but waiting for an angular control setting, and a state in which the yaw angular control of the spreader beam (20) is activated and subject to a received angular setting.

8. The suspension anti-rotation device (14) according to claim 6, wherein a main sling (16C) of the sling system (16A, 16B, 16C), for carrying the yaw rotation transverse axis ($A_2$) of the spreader beam (20), comprises a swivel (18) at one end of the main sling (16C) for connection to one of the lifting and moving machine (10) and to the spreader beam (20).

9. The suspension anti-rotation device (14) according to claim 2, wherein the spreader beam (20) has a visual indicator (36) mounted thereon with at least three different visual states indicating an operating state of a yaw angular control of the spreader beam (20) out of at least three possible different operational states:

a state in which the yaw angular control of the spreader beam (20) is not activated, a state in which the yaw angular control of the spreader beam (20) is activated but waiting for an angular control setting, and a state in which the yaw angular control of the spreader beam (20) is activated and subject to a received angular setting.

10. The suspension anti-rotation device (14) according to claim 2, wherein a main sling (16C) of the sling system (16A, 16B, 16C), for carrying the yaw rotation transverse axis ($A_2$) of the spreader beam (20), comprises a swivel (18) at one end of the main sling (16C) for connection to one of the lifting and moving machine (10) and to the spreader beam (20).

11. The suspension anti-rotation device (14) according to claim 1, wherein a main sling (16C) of the sling system (16A, 16B, 16C), for carrying the yaw rotation transverse axis ($A_2$) of the spreader beam (20), comprises a swivel (18) at one end of the main sling (16C) for connection to one of the lifting and moving machine (10) and the spreader beam (20).

12. A method for lifting and moving a load (12) using a suspension anti-rotation device (14) according to claim 1, comprising the following steps:

fastening (102) the sling system (16A, 16B, 16C) of the suspension anti-rotation device (14) to the lifting and moving machine (10);

fastening (104) suspension anti-rotation device (14) to the load (12);

elevating and moving (106) the load (12) towards a zone of deposition using the lifting and moving machine (10); and during the step (106) of elevating and moving the load (12), controlling (108) of the propulsion means (28) of the spreader beam (20) in such a way as to maintain the spreader beam (20) in a defined setting direction about the yaw rotation transverse axis (A2) with respect to a reference frame linked either to the lifting and moving machine (10) or to the ground.

13. The method for lifting and moving a load (12) according to claim 12, wherein the load (12) is a section of pylon for lines for transporting electricity by cable, and the lifting and moving machine (10) is a helicopter carrying the sling system (16A, 16B, 16C).

14. The method for lifting and moving a load (12) according to claim 12, wherein the load (12) is a section of pylon for lines for transporting electricity by cable, and the lifting and moving machine (10) is a helicopter carrying the sling system (16A, 16B, 16C).

15. An anti-rotation device (14) for suspending a load (12) under a machine (10) for lifting and moving the load (12), comprising:

a sling system (16A, 16B, 16C) provided with an element (18) for fastening to the lifting and moving machine (10); and a spreader beam (20) having a main longitudinal axis ($A_1$) and a yaw rotation transverse axis ($A_2$), the spreader beam (20) including each of:

a system (22A, 22B) for upper fastening to the sling system (16A, 16B, 16C), configured so that the spreader beam is suspended in a substantially horizontal arrangement of the main longitudinal axis ($A_1$) and free about the yaw rotation transverse axis ($A_2$) beneath the lifting and moving machine (10), a system (24A, 24B, 26A, 26B) for lower fastening to the load (12), configured to allow driving of the load (12) by the spreader beam (20) around the yaw rotation transverse axis (A2), and propulsion means (28) disposed in such a way as to cause a rotation of the spreader beam (20), on command, selectively in either of a first or a second direction, about the yaw rotation transverse axis ($A_2$) when the spreader beam is suspended from the lifting and moving machine (10) via the sling system (16A, 16B, 16C), wherein the spreader beam (20) has a visual indicator (36) mounted thereon with at least three different visual states indicating an operating state of a yaw angular control of the spreader beam (20) out of at least three possible different operational states:

a state in which the yaw angular control of the spreader beam (20) is not activated, a state in which the yaw angular control of the spreader beam (20) is activated but waiting for an angular control setting, and a state in which the yaw angular control of the spreader beam (20) is activated and subject to a received angular setting.

16. The suspension anti-rotation device (14) according to claim 15, wherein a main sling (16C) of the sling system (16A, 16B, 16C), for carrying the yaw rotation transverse axis ($A_2$) of the spreader beam (20), comprises a swivel (18) at one end of the main sling (16C) for connection to one of the lifting and moving machine (10) and the spreader beam (20).

17. The suspension anti-rotation device (14) according to claim 15, wherein the propulsion means (28) comprise a system of motorized propellers (32A, 52A, 32B, 52B) disposed at longitudinal ends of the spreader beam (20).

18. The suspension anti-rotation device (14) according to claim 17, wherein:

a first propeller (32A) of the propulsion means (28), disposed at a first end of the spreader beam (20), can be activated according to a first rotation, comprised between 4000 and 6000 rpm, allowing a rotation of the spreader beam (20) in the first direction of yaw rotation; and a second propeller (32B) of the propulsion means (28), disposed at a second end of the spreader beam (20), can be activated according to a second rotation, comprised between 4000 and 6000 rpm, allowing a rotation of the spreader beam (20) in the second direction of yaw rotation opposite to the first direction.

19. The suspension anti-rotation device (14) according to claim 17, wherein each propeller (32A, 32B) of the propulsion means (28) is disposed in a substantially cylindrical fairing duct (34A, 34B) around an axis orthogonal to the main longitudinal axis ($A_1$) and to the yaw rotation transverse axis ($A_2$) of the spreader beam (20).

20. A method for lifting and moving a load (12) using a suspension anti-rotation device (14) according to claim 15, comprising the following steps:
- fastening (102) the sling system (16A, 16B, 16C) of the suspension anti-rotation device (14) to the lifting and moving machine (10);
- fastening (104) suspension anti-rotation device (14) to the load (12);
- elevating and moving (106) the load (12) towards a zone of deposition using the lifting and moving machine (10); and
- during the step (106) of elevating and moving the load (12), controlling (108) the propulsion means (28) of the spreader beam (20) in such a way as to maintain the spreader beam (20) in a defined setting direction about the yaw rotation transverse axis (A2) with respect to a reference frame linked either to the lifting and moving machine (10) or to the ground.

* * * * *